(12) United States Patent
Blount

(10) Patent No.: US 6,423,251 B1
(45) Date of Patent: *Jul. 23, 2002

(54) UREA AND BORATES FOR FIRE AND TERMITE CONTROL

(76) Inventor: David H. Blount, 6728 Del Cerro Blvd., San Diego, CA (US) 92120

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/754,579

(22) Filed: Jan. 5, 2001

Related U.S. Application Data

(60) Continuation-in-part of application No. 09/149,847, filed on Sep. 6, 1998, now Pat. No. 6,258,298, which is a division of application No. 08/723,779, filed on Sep. 30, 1996, now Pat. No. 5,854,309.

(51) Int. Cl.$^7$ .................. C09K 21/02; C09K 21/00; C09K 21/06; C09K 21/14; C08J 9/00
(52) U.S. Cl. .................. 252/609; 252/607; 252/608; 252/601; 528/259; 523/179; 521/94; 521/95; 564/8
(58) Field of Search .................. 252/609, 608, 252/607, 601; 525/428; 528/259; 523/179; 521/94, 95; 564/1, 5, 8, 12, 32, 38, 39, 45, 58, 59

(56) References Cited

U.S. PATENT DOCUMENTS

| | | | | | |
|---|---|---|---|---|---|
| 4,999,383 | A | * | 3/1991 | Blount | .......... 521/103 |
| 5,788,915 | A | * | 8/1998 | Blount | .......... 252/609 |
| 5,854,309 | A | * | 12/1998 | Blount | .......... 523/179 |
| 6,156,240 | A | * | 12/2000 | Blount | .......... 252/601 |
| 6,258,298 | B1 | * | 7/2001 | Blount | .......... 252/607 |
| 6,270,694 | B1 | * | 8/2001 | Blount | .......... 252/607 |

* cited by examiner

*Primary Examiner*—Joseph D. Anthony

(57) ABSTRACT

Aqueous urea condensate-boron oxyacid salts composition may be utilized to fight grass, forest, building, and other flammable organic material by applying it to these flammable organic materials. The solid or aqueous urea condensate-boron oxyacid salts composition may also be incorporated into flammable materials such as solid and foam plastic and natural materials. Urea condensate-boron oxyacid salts composition may also contain carbonization auxiliaries, such as phosphorus containing compounds, metal containing compounds that will accelerate carbonization, heat reflector, surfactant and fillers. The urea condensate-boron oxyacid salts composition is produced by mixing, heating and/or reacting urea, boron oxyacids and alkali metal hydroxide or alkaline earth metal hydroxide or oxide or the boron oxyacids maybe first reacted with the alkali metal hydroxide or the alkaline earth metal oxide or hydroxide.

15 Claims, No Drawings

UREA AND BORATES FOR FIRE AND TERMITE CONTROL

This application is a continuation in part of patent application Ser. No. 09/149,847 filed Sep. 6, 1998 now U.S. Pat. No. 6,258,298 which is a division of patent application Ser. No. 08/723,779 filed Sep. 30, 1996, now U.S. Pat. No. 5,854,309.

FIELD

This invention concerns solid or aqueous urea and/or urea condensates and boron salts emulsions utilized as fire and termite controlling agent. The invention also concerns the preparation and use of solid or aqueous emulsions of urea and/or urea condensates and/or partially hydrolyzed urea condensate and boron salts emulsions. The aqueous urea and/or urea condensates and boron salts are useful to stop house fires, grass and forest fires, to produce flame retarded water based plastic, flame retarded polyurethane foam ,etc, and flame retard flammable organic materials by spraying the outside with aqueous emulsions of urea and/or an aqueous urea composition and for termite control in wood, lignin-cellulose, cellulose products and organic foams. The powdered urea and/or urea condensates and powdered boron salts may be used to flame retard plastics.

BACKGROUND

Urea in the form of a solid compound has been used as a flame retardant agent in polyurethane foams as outline in U.S. Pat. No. 4,385,131 (Fracalossi, et al.). Many patents use solid urea condensates, urea phosphates, urea borates and urea derivative as the flame retardant agent. The use of urea and/or urea condensate with boron salts as both the flame retardant and termite controlling compound is novel. The urea condensate-boron oxyacid salt is novel. The urea condensate-boron oxyacid salt slowly breaks down in an aqueous solution to urea, urea condensate and boron oxyacid salts. Boron oxyacid salts are being utilized as termite insecticides and have some flame retardant properties, but are not adequate to pass the required flame retardant tests. When solid urea is used in sufficient amounts, as the flame retardant retardant compound in the production flame retardant organic products, such as polyurethane products it leaves a slimy or soapy feel to the outer surface of the urethane products, which is very undesirable. The urea migrates out and the product becomes less fire retardant. When the aqueous urea is utilized, the water and urea reacts with the polyisocyanate and becomes a part of the product. There is no slimy or soapy feel to this foam. Aqueous urea is a fertilizer and is very environmentally safe product to use on grass and forest fires. When used for fire fighting and termite control the aqueous urea and/or urea condensate and boron oxyacid salts may contain coloring agents such as iron oxide, thickening agents, gelling agents, corrosive inhibitors, bactericide agents, surfactant and wetting agents.

What is lacking and what is needed are useful, safe and inexpensive flame retardant compounds and termite control compounds combinations found in aqueous urea and/or urea condensate and boron oxyacid salts. What is additionally lacking are compositions have solid or aqueous urea and/or urea condensates and boron oxyacid salts employed therein.

SUMMARY

In one aspect, the invention comprises the flame retardant and termite insecticide aqueous urea and/or urea condensates with boron oxyacid salts. Another aspect of the invention is a process to prepare the solid or aqueous urea and/or urea condensate with boron oxyacid salts. Urea and boron oxyacid salts are commercially available. Termites are found in wood and in some plastic around wood such as organic foams, such a polyurethane insulation and furniture foams, paper materials and cellulose insulations.

Another aspect of this invention is the process to prepare a urea condensate-boron oxyacid salt composition by mixing, heating and reaction the following components.

(A) urea and/or urea condensate and/or partially hydrolyzed urea condensate in the amount of 100 to 200 parts by weight, (B) boron oxyacid, in the amount of 25 to 100 parts by weight;

(C) alkali metal and/or alkaline earth metal oxide or hydroxide, in the amount of 25 to 75 parts by weight;

(D) water 0 to 1000 parts by weight, (E) carbonization auxiliaries, in the amount of 0 to 200 parts by weight, then add and mix (F) metal containing compound that will accelerate the carbonization process, in the amount of 0 to 30 parts by weight;

(G) heat reflecting compound, in the amount of 0 to 30 parts by weight;

(H) filler, in the amount of 0 to 200 parts by weight;

(I) surfactant, in the amount of 0 to 30 parts by weight.

Another aspect of this invention is to apply on and/or incorporating in a more flammable organic material the flame retardant and termite insecticide composition, solid or aqueous urea and/or urea condensates with boron oxyacid salt or the solid or aqueous urea and/or urea condensate-boron oxyacid salts composition.

Another aspect of this invention is to utilize the aqueous urea and/or urea condensate and boron oxyacid salt composition or urea condensate-boron oxyacid salt to fight or prevent fires such as grass fires, forest fires, house fires, furniture fires, etc and prevent termite damage in wood products. In fighting grass fires a water diluted solution of aqueous urea and/or urea condensate with boron oxyacid salts and/or it's composition with or without surfactant, to produce bubbles may be sprayed directly on the flames or may be sprayed in front of the flames thereby wetting the organic materials in front of the fire The aqueous urea and/urea condensate and boron oxyacid salts composition, even after drying, and for several day afterwards, will prevent the coated organic materials such as grass, leaves and bushes from catching on fire when exposed to flames. Wood is penetrated deeper when this aqueous urea condensate-boron oxyacid salt composition is warm or hot, when applied under pressure or in a vacuum or when a surfactant such as a glycol, e.g., ethylene glycol, propylene glycol, polypropylene glycol, polyols, and ethylene oxides such as propylene oxide or other surfactant containing hydroxyl radicals added to the composition. The powdered composition of this invention may be made more fluid by adding alcohol, polyurethane blowing agents such as methylene chloride, halogenated polymethylene compounds, alkylene oxides or other organic solvents.

Component A

Any suitable urea may be utilized in this invention. Usually the aqueous solution of urea contains 50% or less of urea. Urea condensates, such as biuret, cyanuric acid, cyamelide and partially hydrolyzed urea condensates may also be used in the amount of 100 to 200 parts by weight.

Component B

Any suitable boron oxyacid may b used in this invention. Boric acid is preferred. Suitable boron salts are alkali metal boron oxyacids, alkaline earth metal boron oxyacids and metal boron oxyacids. Sodium borate and zinc borate are the preferred boron oxyacid salts. Boron oxyacid may be used in the amount of 25 to 100 parts by weight. The boron oxyacid salts may be used in the amount of 50 to 100 parts by weight.

Component C

Any suitable basic salt forming compound containing an alkali metal or alkaline metal oxide or hydroxide may be used in this invention. Alkali metal oxides or hydroxide and alkaline earth metal oxides and hydroxide, preferable sodium hydroxide and zinc oxide. The alkali metal oxides or hydroxides and/or alkaline earth metal oxides or hydroxides are used in the amount of 25 to 75 parts by weight. The basic salt forming compound such as sodium hydroxide or zinc oxide may be first reacted with the boron oxyacid to produce sodium borate or zinc borate and use in the amount of 50 to 100 parts by weight, then mixed with or reacted with the urea compounds.

Component D

Any suitable amount of water may be used, referable 0 to 1000 parts by weight.

Component E

Any suitable carbonization auxiliaries may be utilized in this invention. Suitable carbonization auxiliaries are compounds that in the presence of fire assist the formation of a carbonization foam or char, such as, additives that produce acidic components in the pyrolysis mixture, such as phosphorus acids, boric acids or sulfuric acids. These acidic components are compounds such, for example, acids or salts, or their derivatives of sulfur, boron and phosphorus, such as, boron-phosphates, phosphates, and polyphosphates of ammonia, amines, polyamines, amino compounds, thioureas and alkyanolamines, but boric acid and its salts and their derivatives, organic phosphorus compounds and their salts, halogenated organic phosphorus compounds, their salts and their derivatives, sulfuric acids, their salts and their derivatives such as ammonium sulfate, urea sulfate, etc., may also be used for this purpose. The commonly known fertilizer which contains phosphorus or sulfur are inexpensive carbonization auxiliaries that can be used with the aqueous urea especially in fire fighting and fire prevention and are preferred. The carbonization auxiliaries and other flame retardant agents may be used in quantities of 0 to 200 parts by weight. The carbonization auxiliaries and other flame retardant agents are not a necessary component but when used is used in an amount of 5 to 200 part by weight.

The nitrogen containing salts of phosphorus acids are the preferred carbonization compounds, such as amino phosphate, amine and polyamine phosphates, amino salts of organic phosphorus compounds and amino condensation salt of inorganic and organic phosphorus compounds. The condensation salt of phosphorus compounds are produced by contacting urea condensates such as, biuret, cyanuric acid and cyamelide or other amino compounds with a phosphorus containing compound that will react with an amino compound, under conditions sufficient to prepare an amino salts of a phosphorus containing compound.

Suitable inorganic phosphorus compounds include, but not limited to, phosphoric acid, pyrophosphoric acid, triphosphoric acid, metaphosphoric acid, phosphorous acid, hydrophosphorous acid, phosphinic acid, phosphinous acid, phosphine oxide, phosphorus trihalides, phosphorus oxyhalides, phosphorus oxide, and their salts, amino phosphates, amine phosphates, mono-metal hydrogen phosphates, ammonium dihydrogen phosphate, ammonium phosphate, bromated phosphates, alkali metal dihydrogen phosphate, and halogenated phosphate-phosphite and their halides and acids. organic phosphorus compounds include, but not limited to, alkyl, cyclic, aryl and alkyl-aryl phosphorus compounds, such as, alkylchlorophosphines, alkyl phosphines, alkyl phosphites, dialkyl hydrogen phosphites, dialkyl alkyl phosphonates, trialkyl phosphites, organic acid phosphates, organic diphosphonate esters, aryl phosphites, aryl hydrogen phosphates, halogenated phosphonates esters, biuret phosphate, cyanuric phosphate, cyamelide phosphate, and urea, biuret, cyanuric acid and cyamelide borates and mixtures thereof.

Component F

Any suitable metal-containing compound that will accelerate carbonization effect used in this invention increases the amount of carbonization residue after combustion, thereby enhancing the flame retardant effect and may be used in this invention. These compounds include, but not limited to, alkaline earth metal borates such as magnesium borate, calcium magnesium borate and the like, manganese borate, zinc borate, metal oxides of titanium oxide, tin oxide, nickel oxide, zinc oxide and the like, ferrocene, dimethylglyoxime copper, acetyl-acetonatocooper, hydroxyquinoline nickel and the like, zinc thiocarbamate compounds such as zinc dimethylthio-carbamate, zinc di-n-butyidithiocarbamate and the like, mercaptobenzothiazole zinc compounds such as mercaptobenzothiazole zinc and the like, salicyadehyde zinc compounds such as salicylaldehyde zinc and the like, metal hydroxides such as aluminum hydroxide, magnesium hydroxide, calcium magnesium hydroxide, zirconium hydroxide and the like and mixtures thereof. The most preferable compounds are selected from zinc oxide, zinc thiocarbamates, the mercaptobenzothiazole zinc compounds the salicyaldehyde zinc compounds, zinc borate and the alkaline earth metal borates. The are utilized in the amount of 0 to 30 parts by weight. These metal containing carbonization accelerators are not necessary components but when used it is used in the amount of 1 to 30 parts by weight.

Component G

Any suitable compound that will reflect heat compound such as titanium oxide may be used in this invention and used in the amount of 0 to 30 part by weight

Component H

Any suitable filler may be used in this invention. The fillers that may be utilized in the flame retardant mixture are usually insoluble in the reaction mixtures. They may be inorganic substances, such as, alkali metal silicates, alkaline earth metal silicates, metal silicates, silica, metals, oxides, carbonates, sulphates, phosphates, borates, glass beads or hollow glass beads. Hydrated aluminum oxide is preferred. They may be organic substances, such as, amino compounds, such as urea, melamine, dicyandiamide, urea condensates, urea-amino condensates, partially hydrolyzed urea condensates and other amino derivatives or their formaldehyde resins, amino phosphates, amino salts of organic phosphates, phenol-aldehyde resin powder, ammonium sulfates, urea sulfates, nitrogen containing sulfates, powdered coke, graphite, graphite compounds, Portland cement, lignin and mixtures thereof. The organic halide flame retardant compounds may also be added as fillers. The filler may be used in the amount of 0 to 200 weight. Fillers are not a necessary component, but useful, and if used it is used in the amount of 1 to 200 parts by weight.

Component I

Any suitable surfactant that will assist in the production of bubbles or used as a wetting agent may be used in this invention, such as soaps, detergents and silicon surfactants, such as water-soluble polyester siloxanes. Any surface active agent that will assist in the formation of foam or as a wetting agent such as cationic, anionic, non-ionic and amphoteric surfactants may be used in this invention. The surfactant may be used in the amount of 0 to 30 parts by weight. The surfactant is not a necessary component except when bubbles and wetting agents are desired, then it is used in the amount of 1 to 30 parts by weight.

Component J

Any suitable organic material which is more flammable than the aqueous urea and/or the aqueous urea composition may be used in this invention. Any suitable plastic resin composition or mixtures thereof and any suitable natural organic material maybe used in this invention and mixtures thereof. These materials may be in the form of a solid, cellular suspension, emulsion or solution but the plastic are preferable to be in the form of or a suspension, emulsion, solution or as a liquid monomer. Suitable plastic resin include, but not limited to, vinyl dienes, vinyl-diene copolymers, polyesters, polyester resins, phenoplasts, aminoplasts, polyepoxy resins, polyurethanes, furans, polyamides, polyimides, polycarbonates, homopolymers of such olefins as ethylene, propylene, and butylene; block copolymers, Consisting of optional combination of these olefins; polymers of vinyl compounds such as vinyl chloride, acrylonitrile, methyl acrylates, vinyl acetates and styrene; copolymers of the foregoing olefins with vinyl monomers, copolymers and terpolymers of the foregoing olefins, with diene compounds; polyesters such as polyethylene terephthalate, polyester resins; polyamides such as nylon; polycarbonates, polyoxymethylene, silicones, polyethers, thioplasts, polytetrafluoroethylene, polysulfones, vinyidienes, poly(vinyl acet compounds, cyclic unsaturated compounds, urethane-epoxy resins, polyimides, urethane silicates, cellulose nitrate rayon, regenerated cellulose film cellulose acetate, cellulose esters, cellulose ethers, cyanoethyl cellulose, chlorinated rubber and mixtures thereof.

Suitable natural products include but not limited to grass, weeds, leaves, wood, cellulose, lignin-cellulose, paper, cotton, wool, linen, dammars, copols, other natural resins, rosins, lignin, natural rubber, natural proteins, e.g., soya bean protein, silk, glues, gelatin, etc.; modified cellulose and mixtures thereof. Natural organic material and plastics may be mixed together. The flame retardant and termite insecticide composition of this invention maybe utilized in the amount of 3–200 percent, percentage based on the weight of the more flammable organic material.

Any suitable polyisocyanate may be used in this invention organic polyisocyanates are preferred. The commercial available ones are preferred such as tolylene-2,4-diisocyanate, tolylene-2,6-diisocyanate, polymethylene polyphenyl isocyanate, diphenylmethane 4,4'-diisocyanate, 3-methlydiphenyl-methane-4,4'-diisocyanate, m- and p-phenylenediisocyanante, polyphenylpolymethylene isocyanates obtained by phosgenation, commercially known as "crude MDI", modified polyisacyanates and mixtures thereof. Suitable organic polyisocyanates are exemplified by the organic diisocyanate which are compounds of the general formula

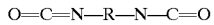

wherein R is a divalent organic radical such as an alkylene, aralkylene or arylene radical. Such radical may contain 2 to 20 carbon atoms. Any suitable compound with active hydrogens may be reacted with the polyisocyanates to produce polyurethane products. The preferred compound with active hydrogens are polyols. Polyurethane catalyst, blowing agents, surfactants, foam stabilizers, dyestuff, plasticizers, propellant, desiccant and fillers may also be used. Polyisocyanate which has the formula

in which m represent a number from 2 to 4 and Q represents an aliphatic hydrocarbon radical having 2 to 18 C atoms, a cycloaliphatic hydrocarbon radical having 4 to 15 C atoms, an aromatic hydrocarbon radical having 6 to 15 C atoms, or araliphatic hydrocarbon radical having 8 to 15 C atoms and an organic compounds with 1 or more active hydrogens which will react with an isocyanate, in the amount of 25 to 100 parts by weight, containing a urethane catalyst, in the amount of 0.25 to 10 parts by weight, a plasticizer, propellants and a silicone surfactant, in the amount of 0.5 to 5 parts by weight, may be used as the flammable organic material. Any suitable polyepoxy compounds may be used in this invention such as ally glycidyl ether, tert-butyl glycidyl, and the like.

Illustrative Embodiments

In general, the aqueous urea usually produced by reacting ammonia and carbon dioxide in an aqueous medium while under heat and pressure. This aqueous urea may be utilized in this invention or the urea can be crystalized by removing some of the water. The solid urea may then be added to water to form an aqueous solution of urea which usually contains less than 50% urea. Aqueous urea when only mixed with boron oxyacid salts are good flame retardants, when used to treat wood. It is necessary to heat the aqueous urea to 70°–100° C. to condensate the urea. Urea may be heated to about its boiling point to produce urea condensates which are soluble in water. When urea is heated to above its melting point urea condensates are formed, first biuret, then a mixture of cyanuric acid and cyamelide. Cyamelide is in soluble in water. Partially hydrolyzed urea condensates are produced by adding some water to urea then heating urea to above its melting point.

Any amount of the solid or aqueous urea and/or urea condensate with boron oxyacid salts composition or urea condensate-boron oxyacid salt, which may include carbonization auxiliaries, metal containing compounds that accelerated carbonization, heat reflecting substances, surfactant and fillers may be used. Preferably, when the heated solid or aqueous urea and/or urea condensate with boron oxyacid salt composition is incorporated on or in the more flammable organic material an amount of 3 to 200% by weight, percentage based on the weight of the more flammable organic material is utilized. When the aqueous urea and/or urea condensate with boron oxyacid salt composition or aqueous urea condensate-boron oxyacid salt are applied on the more flammable organic material in a sufficient amount will produce a less flammable organic material. Usually an amount that will wet the surface of the flammable organic material is sufficient.

The solid or aqueous urea and/or urea condensate with boron oxyacid salts or urea condensate-boron oxyacid salt compositions are usually added on or incorporated in the flammable organic material at ambient temperature and pressure but elevated temperatures and pressure or reduced pressure may be utilized when necessary.

One method to measure this flame retardant capability is an oxygen index test. By selecting the various combinations of the mixture of urea condensate-boron oxyacid salt compositions to incorporate into a more flammable organic material the average limiting oxygen index (LOI) can be raised 10 to 30 percent or more when compared to otherwise comparable samples without the flame retardant aqueous urea composition. For example the LOI of three flexible polyurethane foams with the aqueous urea composition were raised more than 30 percent to a LOI of 31.7, 30.3 and 30.7.

When the urea and/or urea condensate containing boron oxyacid salt composition was incorporated into rigid polyurethane foam and tested with a propane torch with a 2" flame held against the foam for one minute, the flame did not spread, the foam melted and/or a char was formed. The flame went out when the torch was removed. Various solid and aqueous urea and/or urea condensate containing boron oxyacid salt compositions were incorporated into liquid resins then cured into a solid in the form of a 1/8"×2"×6" sample, for example, flexible polyepoxy resins, rigid polyepoxy resins, polyester laminating and flexible resin, polystyrene resin, polymethyl methyl acrylate resin, polyvinyl acetate resin, polyurethane, polyisoprene, polyethylene, acrylonitrile, etc, then tested with a propane torch having a 2" flame, and held against the sample for one minute, the flame did not spread, and went out when the flame was removed. Various mixture of aqueous urea and/or aqueous urea compositions was add to aqueous emulsions and organic solutions of the above plastics then dried to form a test sample, then tested as above.

The flexible flame retardant polyurethane foams were tested and passed the Calif. TB 133 test which utilizes a 100 gms of wood in the form of a crib being burned on top of the flexible foam. If more than 60 gms of the foam burns away it fails this test.

Various natural products such as wood chips, wood shingles, paper, cotton cloth, and cardboard were coated with various urea and/or urea condensate with boron oxyacid salt compositions or urea condensate-boron oxyacid salts in an aqueous emulsion containing 20% by weight of the urea and/or urea condensate with 10% by weight of boron oxyacid salt composition with or without adhesives, then after the product had dried, they were tested by applying a 2" Bunsen burner flame against the products for 1 minute, and the flame did not spread whereas the non-coated products caught on fire and burned.

DESCRIPTION OF PREFERRED EXAMPLES

The present invention will now be explained herein-after by way of a few examples and comparative examples, these examples setting, however, no limits to this invention. Parts and percentage are by weight, unless otherwise indicated.

EXAMPLE 1

Two-three heated moles of ammonia to one mol of heated carbon dioxide, heated at 160 to 210 degree C. is forced through a reactor which has an aqueous solution or oil-water slurry of ammonia and carbon dioxide which is being circulated at 160° to 210° C. and under 2–6000 psi to form ammonium carbamate which when heated lose 1 mol of water thereby producing an aqueous urea. The aqueous urea contains small amounts of ammonia, ammonium carbonate and biuret. The aqueous urea is concentrated and the urea crystalizes out. The urea may be heated to above the boiling point of urea to produce biuret or cyanuric acid and cyamelide. When urea is heated with a small amount of water it condensates to for a partially hydrolyzed urea condensate.

EXAMPLE 2

200 parts by weight of urea, 50 parts by weight of sodium borate, hydrate and 30 parts by weight of zinc borate are mixed, heated and agitated until the urea melts at about 130° C. thereby producing a urea condensate-boron oxyacid salt composition. The composition is added to 1000 parts by weight of water thereby forming an emulsion.

EXAMPLE 3

200 parts by weight of urea, 100 parts by weight of sodium borate, hydrate and 20 parts by weight of water is mixed then heated to the melting point of urea. Heating is continued for about 15 minutes thereby producing a sodium-urea condensate-borate composition. The mixture is cooled and ground into a powder.

EXAMPLE 4

100 parts by weight of urea, 40 parts by weight of boric acid, 20 parts by weight of zinc oxide and 40 parts by weight of water are mixed, then heated to above the boiling point of water until the water evaporates thereby producing a zinc-urea condensate-borate composition. The composition is cooled then ground into a powder.

EXAMPLE 5

100 parts by weight of urea, 30 parts by weight of sodium borate, 20 parts by weight of zinc borate and 40 parts by weight of water are mixed, then heated to above the boiling point of water till the water evaporates thereby producing a urea condensate-boron oxyacid salt composition. It is cooled into a solid then ground into a powder.

EXAMPLE 6

100 parts by weight of urea, 20 parts by weight of boric acid, 15 parts by weight of sodium hydroxide and 40 parts by weight of water are mixed then heated to above the boiling point of water till the water evaporates thereby producing a sodium-urea condensate-boron oxyacid salt composition. It is cooled to form a solid then ground into a powder.

EXAMPLE 7

100 parts by weight of urea, 30 parts by weight of sodium borate and 400 parts by weight of water are added and mixed then heated to 75° C. thereby forming an aqueous emulsion of urea condensate-boron oxyacid salt composition.

EXAMPLE 8

Example 7 is modified wherein another boron oxyacid salt, zinc borate, is used in place sodium borate.

EXAMPLE 9

Example 7 is modified wherein 20 parts by of zinc borate is added with the sodium borate.

EXAMPLE 10

Example 7 is modified wherein another compound is used in place of urea and selected from the group consisting of (a) biuret, (b) cyanuric acid and cyamelide and (c) partially hydrolyzed concentrate urea.

EXAMPLE 11

100 parts by weight of urea and 75 parts by weight of a carbonization auxiliary, phosphoric acid is mixed, heated to about 75° C. and reacted then 30 parts of zinc borate powder is added thereby producing zinc borate-urea phosphate composition. The composition is cools then is ground into a powder.

EXAMPLE 12

Example 11 is modified wherein another amino compound is used in place of urea and selected from the group consisting of (a) buiret, (b) cyanuric acid, (c) cyamelide and (d) partially hydrolyzed urea condensate.

EXAMPLE 13

Example 11 is modified wherein sulfuric acid is used in place of phosphoric acid.

EXAMPLE 14

Pine wood chips averaging $\frac{1}{8}$" thick was place into an aqueous emulsion containing 25% by weight of the composition produced in Example 2 for about 1 minute. Also $\frac{3}{4}$"×$\frac{3}{4}$"×8" pine board, $\frac{1}{2}$"×2"×6" plywood and $\frac{1}{2}$"×2"×6" particle board was spayed with this composition till wet. The chips were dried then flame tested using a 2" Bunsen burner flame place under and touching the vertically held chip. The area hit by the flame charred but did not catch on fire. It was further tested for 2 minutes and it did not catch on fire. The other boards, plywood and particle board was tested using a 4" Bunsen burner flame place against the bottom of the verticle hanging samples for 2 minutes. The flames did not spread and went out shortly after the flame was removed. Untreated wood chips catch on fire in 2–3 seconds. The wood chips were dried at 400° F. then flame tested as above and did not catch on fire.

EXAMPLE 15

Example 14 is modified wherein another composition is used and selected from the example list: (a) Example 3, (b) example 4, (c) example 5, (d) example 6, (e) example 7, example 8, example 9 and example 11.

EXAMPLE 16

A $\frac{3}{4}$"×$\frac{3}{4}$"×3" pine board was place in a test pressure chamber then filled with an aqueous solution containing 20% by weight of the composition produced in example 11. Pressure was applied to the aqueous suspension. The board was removed from the pressure chamber then dried. The dried board was flame tested with a 3" Bunsen burner flame place against the side of the board for 3 minutes. The board charred but did not catch on fire.

EXAMPLE 17

Example 16 is modified wherein a test vacuum chamber is used in place of the pressure chamber and a vacuum is applied instead of pressure. The board was tested as in example 16 and did not catch on fire.

EXAMPLE 18

Example 16 is modified wherein the composition is produced in example 2 and 5% by weight of propylene glycol added to the composition then the composition is heated to 70° to 80° C.

EXAMPLE 19

The two by fours studs, ceiling joist, floor joist and indoor plywood was sprayed on the inside of an unfinished house with an aqueous emulsion containing 20% composition produced in example 2, thereby applying flame retardant compounds and insecticide for termites. A 4" Bunsen burner flame was placed against the dried treated stud for 5 minutes and the stud did not catch on fire.

EXAMPLE 20

An area 3'×6' with dry grass, weeds and leaves of an average of 1' tall was sprayed in the middle 2'×3' area with an aqueous solution containing 20% of the composition produced in example 3 until the grass and weeds were wet. One side of the dry material was set on fire and the fire traveled to the center treated area and stopped. The fire did not cross over to the other untreated area.

EXAMPLE 21

Example 20 is modified to wherein the wetted area was dried, and the other untreated side was set on fire. The fire traveled to the treated middle section then went out.

EXAMPLE 22

Example 20 is modified wherein the middle section was dried for 4 days then a 3' square pile of dry grass, weeds and leaves were placed next to the treated section on both sides then one side was set on fire. The fire burned to the treated section then some of the lower grass burned but went out before spreading to the other side.

EXAMPLE 23

A 3'×3'×3' pile of green fir tree branches was sprayed with an aqueous emulsion containing 30% by weight of the composition produced in example 11, until it was wet then allowed to dry. A 2'×3'×2' pile of dry grass was place on one side of the treated fir branches. The grass was set on fire and burned. A few needles of the fir branches next to the fire burned but did not spread to the rest of the branches. After the fir branches had dried another 2'×3'×2' pile of dry grass was placed on the opposite side and next to the treated fir branches. The grass burned and some of the fir needles burned but the flames did not spread to the rest of the fir branches.

EXAMPLE 24

A 1+×1'×0.5" square of an untreated polyurethane foamed mattress was sprayed with an aqueous emulsion containing 25% of the composition produced in example 6 until the mattress foam was wet. The mattress was allowed to dry for 2 days then a burning cigarette was placed on the foam. The cigarette burned out but the foam did not catch on fire.

EXAMPLE 25

Example 24 is modified wherein strips of cotton, polyester, nylon and acrylic cloth was placed on the treated polyurethane foamed mattress, then the strips were set on fire. The cloth strip burned but the foam did not catch on fire.

EXAMPLE 26

A 1'×1'×6" rigid polyurethane foam was sprayed with an aqueous emulsion containing 20% composition produced in example 10b and containing 10% by weight of a carbonization auxiliary, ammonium polyphosphate, until the foam was wet. The foam was dried for 3 days then flame tested by burning 50 gms of wood chips on top of the rigid foam. The foam did not catch on fire but there was about a 10% volume loss.

EXAMPLE 27

Example 26 is modified wherein another carbonization auxiliary is used in place of ammonium polyphosphate and selected from the list below:
a) pyrophosphoric acid
b) phosphinic acid
c) phosphorus trichloride
d) phosphorus oxytrichloride
e) phosphorus oxide
f) ammonium dihydrogen phosphate
g) mono-aluminum phosphate
h) dimethyl methyl phosphonate (DMMP)
i) dimethyl hydrogen phosphite
m) phosphorus thiochloride
j) phenyl acid phosphate
k) methylchlorophosphine
l) phosphorus
n) tris(2-chloropropyl)phosphate
o) triphenyl phosphite
p) tris 2-chloroethyl phosphite
q) triethyl phosphite
r) urea dihydrogen phosphate
s) diethyl phosphite
t) trimethyl phosphite
u) dibutyl pyrophosphoric acid
v) O,O-dimethyl hydrogen dithiophosphate
w) melamine hydrogen boron-phosphate
x) hypophosphorous acid
y) methyl amine salt of phosphoric acid
z) ammonium sulfate

EXAMPLE 28

A 4'×4'×3' pile of dry branches from fir, cedar and oak trees was set on fire, then after the fire was burning good it was sprayed with an aqueous emulsion containing 20% by weight of the composition produced in example 7 and the fire went out quickly.

EXAMPLE 29

Example 24 is modified wherein a carbonization auxiliary is added to the emulsion in the amount of 5% by weight, percentage based on the weight of the aqueous emulsion and selected from the list below:
a) dimelamine phosphate
b) dicyandiamide phosphate
c) urea dihydrogen phosphate
d) guanidine phosphate
e) aminoguanidine phosphate
f) diethyltriamine urea phosphate
g) melamine salt of dimethyl methyl phosphonate
h) melamine salt of dimethyl hydrogen phosphite
i) methylamine melamine phosphoric acid
j) methyl carbamate salt of phosphoric acid
k) melamine salt of boron-hydrogen phosphate
l) O-methyl urea
m) urea salt of boron-phosphate
n) urea-formaldehyde phosphate
o) aminophenol phosphate
p) ammonium urea phosphate
q) ammonium melamine phosphate
r) melamine salt of trimethyl phosphite
s) melamine salt of phenyl acid phosphate
t) cyanuric phosphate

EXAMPLE 30

About 25 parts by weight of aqueous emulsion containing 20% of the composition produced in example 2, 20% urea, 20% sucrose, 2% amine urethane catalyst and 0.3% silicone foam regulator surfactant are mixed with 35 parts by weight of MDI thereby producing a rigid, fine cells, polyurethane foam which weighed about 1 lb./cu. ft. After 1 week a ½"×2"×6" vertically placed sample of this foam was tested using a 2" blue Bunsen burner flame placed at the bottom of the sample for 1 minute. The foam under the flame formed a char. The foam did not catch on fire.

EXAMPLE 31

Example 1 and 2 are modified wherein the aqueous urea is heat to the boiling point of the solution thereby producing an aqueous jpartially hydrolyzed urea condensate.

EXAMPLE 32

Example 19 is modified wherein 5% by weight, percentage based on the weight of the aqueous emulsion, of a carbonization auxiliary is added to the aqueous emulsion, and the carbonization auxiliary is selected from the list below:
a) dimelamine phosphate
b) dicyandiamide phosphate
c) urea dihydrogen phosphate
d) guanidine phosphate
e) aminoguanidine phosphate
f) diethyltriamine urea phosphate
g) melamine salt of dimethyl methyl phosphonate
h) melamine salt of dimethyl hydrogen phosphite
i) methylamine melamine phosphoric acid
j) methyl carbamate salt of phosphoric acid phosphate
k) melamine salt of boron-hydrogen phosphate
l) O-methyl urea
m) urea salt of boron-phosphate
n) urea-formaldehyde phosphate
o) aminophenol phosphate
p) ammonium urea phosphate
q) ammonium melamine phosphate
r) melamine salt of trimethyl phosphite
s) melamine salt of phenyl acid phosphate
t) ammonium sulfate

EXAMPLE 33

Example 30 is modified wherein 10% by weight, based on the weight of the aqueous emulsion, of a filler selected from the list below is added to the aqueous urea condensate composition and selected from the list below:
a) hydrated aluminum oxide powder
b) hydrated sodium silicate powder
c) melamine
d) dicyandiamide
e) urea sulfate
f) melamine phosphate
g) melamine borate h) ammonium phosphate
i) ammonium pyrophosphate
j) ammonium carbonate
k) ammonium borate
l) ammonium sulfamate
m) guanidine
n) guanidine carbonate
o) urea phosphate
p) silica powder
q) phenol-formaldehyde resin powder
r) aluminum phosphate
s) thiourea
t) hollow beads
u) expandable graphite
v) melamine salt of DMMP
r) ammonium sulfate
s) magnesium chloride
t) antimony trioxide
u) boron-phosphate powder
w) melamine boron-phosphate powder

EXAMPLE 34

Example 23 is modified wherein 10% by weight, percentage based on the weight of the aqueous emulsion, of a phosphorus salt forming compound is added to the aqueous emulsion and selected from the list below:
a) phosphoric acid
b) pyrophosphoric acid
c) dimethyl methyl phosphonate (DMMP)
d) dimethyl hydrogen phosphite
e) trimethyl phosphite
f) phenyl acid phosphate
g) phosphorus trichloride
h) phosphinic acid
i) phosphorus oxytrichloride
j) ammonium dihydrogen phosphate
k) dimethyl phosphoric acid
l) diethyl ethyl phosphonate
m) magnesium hydrogen phosphate
n) mono aluminum phosphate

EXAMPLE 35

100 parts by weight of the urea condensate-boron oxyacid salt produced in example 3 are mixed with 25 parts by weight of a halogenated flame retardant compound selected from the list below thereby producing a flame retardant composition:
a) brominated epoxy olgmer
b) decabromodiphenyl oxide
c) pentabromodiphenyl oxide
d) 2,3-dibromopropanol
e) octabromodiphenyl oxide
f) tris (dichloropropyl)phosphite
g) tris(dichloropropyl)phosphite

EXAMPLE 36

30 parts by weight of the urea condensate-boron oxyacid salt produced in example 2 and reacted with 15 parts by weight of dimethyl methyl phosphonate (DMMP) thereby producing a composition, then it was added and mixed with 150 parts by weight of a flexible polyepoxy resins with its polyamine curing agent. The resin is cured, then was tested with a 2" propane flame held against the sample for 1 minute. The flame did not spread and the flame went out when the torch was removed. There was about a 2% weight loss.

EXAMPLE 37

20 parts by weight of aqueous urea containing 40% by weight of the urea condensate-oxyacid salt produced in example 6 and 5 parts by weight of dimethyl hydrogen phosphite and 5 parts by weight of melamine are incorporated into 70 parts by weight of a flexible polyurethane foam produced from MDI and a triol which weighs about 1.75 lbs./cu.ft. The foam was flame tested by using Calif. TB 133 Test wherein 100 gms of wood is burned on top of the foam. After burning the wood on the foam there was a 50.5 gms weight loss. A weight loss of less than 60 gms is necessary to pass the test. This foam was flame tested using a ½"×2"× 6" sample hung vertically, then a 2" propane torch flame was placed at the bottom of the sample for 1 minute. The flame did not spread and the foam melted without burning.

EXAMPLE 38

30 parts by weight of aqueous emulsion containing 50% by weight of the urea condensate-boron oxyacid salt, produce in example 2, are incorporated in 100 parts by weight of a rigid polyurethane foam of about 1 lbs./cu.ft., produced using polymeric MDI and aromatic polyester polyol. The rigid polyurethane foam was flame tested using a propane torch that had a 2" flame held against the foam. The flame did not spread and went out when the torch was removed. There was about a 4% weight loss.

EXAMPLE 39

Example 38 is modified wherein 5% by weight, based on the weight of the emulsion, of a carbonization agent is added to the aqueous emulsion and selected from the list below:
a) dimelamine phosphate
b) dicyandiamide phosphate
c) urea dihydrogen phosphate
d) guanidine phosphate
e) aminoguanidine phosphate
f) diethyltriamine urea phosphate
g) melamine salt of dimethyl methyl phosphonate
h) melamine salt of dimethyl hydrogen phosphite
i) methylamine melamine phosphoric acid
j) methyl carbamate salt of phosphoric acid
k) melamine salt of boron-hydrogen phosphate
l) O-methyl urea
m) urea salt of boron-phosphate
n) urea-formaldehyde phosphate
o) aminophenol phosphate
p) ammonium urea phosphate
q) ammonium melamine phosphate
r) melamine salt of trimethyl phosphite
s) melamine salt of phenyl acid phosphate
t) ammonium sulfate

EXAMPLE 40

About 25 parts by weight of an aqueous emulsion which contains 50% by weight of the urea condensate-boron oxyacid salt produced in example 5 and 15 parts by weight of dimethyl hydrogen phosphite, 100 parts by weight of triol component (Daloflex XES 11870 by ICI of Europe) and 60 parts by weight of diphenymethane-4,4'-diisocyanate (Suprasec 2424 by ICI) were mixed and foamed into a flexible foam of about 1.5 lbs./cu. ft. After the foam cured for 1 week it was flame tested using Calif. TB 133. The foam sample passed this test with a 44 gms weight loss. Europe's UL94 HF-1, HF-2 flame test were done using a 2 cm flame from a propane torch for 1 minute placed under the ½"×2"×

6" sample. This foam passed the test. The sample did not catch on fire and the melted drips did not catch on fire.

EXAMPLE 41

Example 23 is modified wherein another carbonization auxiliary is used in place of dimethyl hydrogen phosphite and selected from the list below:
a) dimelamine phosphate
b) dicyandiamide phosphate
c) urea dihydrogen phosphate
d) guanidine phosphate
e) aminoguanidine phosphate
f) diethyltriamine urea phosphate
g) urea salt of dimethyl methyl phosphonate
h) melamine salt of dimethyl hydrogen phosphite
i) methylamine melamine phosphoric acid
j) methyl carbamate salt of phosphoric acid
k) melamine salt of boron-hydrogen phosphate
l) Melamine DMMP
m) urea salt of boron-phosphate
n) urea-formaldehyde phosphate
o) aminophenol phosphate
p) ammonium urea phosphate
q) ammonium melamine phosphate
r) melamine salt of trimethyl phosphite
s) melamine salt of phenyl acid phosphate
t) ammonium sulfate

EXAMPLE 42

75 parts by weight of an aqueous emulsion containing 50% urea condensate-boron-oxyacid salt composition produced in example 3,200 parts by weight of sucrose amine polyol, hydroxyl No. 350, 30 parts by weight of ammonium urea phosphate, 0.1 part by weight of amine catalyst (Dabco R8020 by Air Products), 0.05 parts by weight of tin catalyst (Dabco T-12 by Air Products) and 220 parts by weight of Diphenymethane-4,4'-diisocyanate are mixed then poured into a mold. A rigid foam of about 1.5 lbs./cu. ft. is formed. After 1 week this foam is flame tested with a 2" propane flame by placing the flame at the bottom of a ½"×2"×6" sample for 1 minute. The flame did not spread and the flame went out when the flame was removed. A char was formed and there was about a 4% weight loss.

EXAMPLE 43

Example 25 is modified wherein another polyol is used in place of the sucrose amine polyol and selected from the list below:
a) sucrose amine polyol, hydroxyl No. 530 with 25% polypropylene polyol, hydroxyl No. 450;
b) aromatic amino polyol, hydroxyl No. 530 with 25% polypropylene polyol, hydroxyl No. 650;
c) aromatic polyester polyol, hydroxyl No. 350;
d) sucrose polyol, hydroxyl No. 450;
e) phosphorus polyol (VIRCOL 82 by Albright and Wilson).
These samples were tested as above with same good results.

EXAMPLE 45

Example 25 is modified wherein another polyisocyanate is used and selected from the list below:
a) polymeric MDI (Mondur MR by Miles)
b) polymeric MDI (PAPI 27 by Dow)
c) polymeric MDI (Mondur MRS).

EXAMPLE 46

100 parts by weight of ethylene modified polypropylene glycol (Multranol 7056 by Miles), 20 parts by weight of the aqueous emulsion containing 50% urea condensate-boron oxyacid salt produced in example 6, 20 parts by weight of melamine phosphate, 1 part by weight of silicone surfactant (L6202 by Union Carbide), 1 part weight of urethane catalyst and 50 parts by weight of TDI (Mondur TD80) are mixed then poured into a mold. A flame retardant flexible foam of about 1.5 lbs./cu.ft.is produced. The foam was cured for 1 week then flame tested with a 2" propane flame placed under a ½"×2"×6" sample (UL94-1, HF-2 TEST). The flame did not spread and the melted drippings did not burn.

EXAMPLE 47

Example 46 is modified wherein another carbonization agent is added to in place of melamine phosphate and selected from the list below:
a) diaminophosphate
b) dimethyl methyl phosphonate
c) urea phosphate
d) melamine borate
e) ammonium melamine boron phosphate
f) diethyl phosphite
g) ammonium polyphosphate
h) dicyandimide phosphate
i) ammonium phosphate
j) aluminum phosphate
k) tris2-chloroethyl phosphite
l) zinc borate
m) boron oxide
n) boric acid
o) dimethyl phosphite
p) triethy phosphate
q) guanidine phosphate
r) ammonium sulfamate
These examples were tested as in Example 28 and passed this test.

EXAMPLE 48

30 parts by weight of the aqueous emulsion containing 45% by weight of urea condensate-boron oxyacid salt as produced in Example 7 and 100 parts by weight an aqueous emulsion containing 50% vinyl acetate were mixed then poured into a mold to form a ⅛" thick sample. After the sample was thoroughly dried the sample was flamed tested by using a 2" propane flame held against it for 1 minute. The flame did not spread and went out when the flame was removed.

EXAMPLE 49

Example 48 is modified wherein 5% by weight, percentage based on weight of the emulsion, of a carbonization auxiliary is added to the aqueous urea in place of melamine phosphate and selected from the list below:
a) dimelamine phosphate
b) dicyandiamide phosphate
c) urea dihydrogen phosphate
d) guanidine phosphate
e) aminoguanidine phosphate
f) diethyltriamine urea phosphate
g) melamine salt of dimethyl methyl phosphonate
h) melamine salt of dimethyl hydrogen phosphite
i) methylamine melamine phosphoric acid
j) methyl carbamate salt of phosphoric acid
k) melamine salt of boron-hydrogen phosphate
l) urea melamine phosphate
m) urea salt of boron-phosphate
n) urea-formaldehyde phosphate o) aminophenol phosphate
p) ammonium urea phosphate
q) ammonium melamine phosphate
r) melamine salt of trimethyl phosphite
s) melamine salt of phenyl acid phosphate
u) cyanuric phosphate

EXAMPLE 50

Example 48 is modified wherein the vinyl acetate emulsion is replaced with another emulsion containing 50% by weight of a plastic or natural products listed below;
a) vinyl acetate-ethylene copolymer (Airflex RP-226 by Air Products)
b) vinyl acetate-ethylene copolymer (Airflex RP-245 by Air Products)
c) phenol-formaldehyde resin
d) acrylic enamel paint
e) acrylic latex paint
f) methyl methyl acrylate
g) acrylic acid
h) polyurethane
i) polyester resin
j) epoxy resin
k) starch
l) modified starch
m) polyvinyl chloride
n) polyvinyl chloride-vinyl acetate copolymer
o) polystyrene
p) polyamide from vegetable protein
q) nylon
r) rubber latex
s) polybutadiene-styrene copolymer These samples were tested as in example 39 and gave the same good results.

EXAMPLE 51

Example 50 is modified wherein the aqueous emulsion is replaced with an organic solvent containing a solution or emulsion of the plastic or natural product listed in Example 48 and 50 then flame tested. These samples were tested as in Example 29 and gave the good flame retardant results.

EXAMPLE 52

30 parts by weight the urea condensate-boron oxyacid salt produced in example 2 and 5 parts by weight of a cyclic phosphonate (ANTIBLAZE N from Albright & Wilson), are added to an aqueous emulsion containing 100 parts by weight of styrene monomer, then a catalytic amount of potassium persulfate and ferric sulfate is added. The mixture is agitated for several hours until the styrene polymerizes. The aqueous emulsion of flame retardant polystyrene is poured into mold and allowed to dry. The dried plastic is then flame tested utilizing a 2" propane flame which is placed under and touch the plastic for three 10 seconds periods. The flame did not spread and did not bum when the flame was removed.

EXAMPLE 53

Example 52 is modified wherein another plastic monomer is utilized in place of styrene monomer and selected from the list below:
a) acrylic acid monomer
b) methyl acrylic acid monomer with redox system
c) vinyl acetate monomer
d) vinyl chloride monomer with redox system
e) vinylidene chloride monomer with redox system
f) methyl acrylate monomer with redox system.
g) acrylonitrile monomer with redox system
h) isoprene monomer
i) chloroprene monomer
j) butadiene with acrylonitrile
k) butadiene with styrene
l) N-vinyl pyrrolidone monomer with hydrogen peroxide
m) polyvinyl pyridine monomer
n) vinylidene chloride with vinyl chloride These samples were tested as in example 52 with the same good results

EXAMPLE 56

Example 52 is modified wherein 10 parts by weight of titanium oxide is added to reflect heat.

EXAMPLE 57

Example 52 is modified wherein 3 parts by weight of a carbonization accelerator is added with the aqueous urea and selected from the list below:
a) zinc borate
b) zinc oxide
c) calcium magnesium borate

EXAMPLE 58

Example 52 is modified wherein 5 parts by weight of a filler is added to the aqueous urea and selected from the list below:
a) hydrated aluminum oxide powder
b) hydrated sodium silicate powder
c) melamine
d) dicyandiamide
e) urea
f) melamine phosphate
g) melamine borate
h) ammonium phosphate
i) ammonium pyrophosphate
j) ammonium carbonate
k) ammonium borate
l) ammonium sulfamate
m) guanidine
n) guanidine carbonate
o) urea phosphate
p) silica powder
q) phenol-formaldehyde resin powder
r) aluminum phosphate
s) thiourea
t) hollow beads
u) expandable graphite
v) melamine salt of DMMP
r) ammonium sulfate
s) magnesium chloride
t) antimony trioxide
u) boron-phosphate powder
w) melamine boron-phosphate powder
x) ammonium boron-phosphate

CONCLUSION

Aqueous urea condensate-boron oxyacid salts are good flame retardant and termite insecticides especially for use on wood, lignin-cellulose and cellulose products The addition of the carbonization agents increases the development of an insulating carbon char which helps the materials to resist further degradation and thereby further exposure to flame. A plastic foam for example which contains urea condensate-boron oxyacid salt composition, the melted drippings of the material being flame tested is reduced, and any burning is minimized. There is a lesser amount of smoke given off these flame retardant material when flame tested. resins. The aqueous urea condensate-boron oxyacid salt compositions alone are very good flame retardants in fighting grass and forest fires and flame retarding and termite controlling agent for wood.

It will be appreciated by those skilled in the Arts that changes and modifications of the preferred embodiment can be made without departing from the spirit and broader aspects of the invention as set forth in the appended Claims.

I claim:

1. A method for reducing combustibility and termite damage of a more flammable organic material comprising incorporating urea-alkali metal and/or alkaline earth metal-boron oxyacid salt condensate on or in the more flammable organic material, under reaction conditions of the more flammable organic material, under reaction conditions of the more flammable organic material, said urea-alkali metal and/or alkaline earth metal-boron oxyacid salt condensate produced by the method comprising of mixing and reacting and optionally heating the following components:

(A) urea, in the amount of 100 to 200 parts by weight of urea;

(B) boron oxyacid salt, in the amount of 25 to 100 parts by weight of boron oxyacid salt;

(C) alkali metal and/or alkaline earth metal oxide or hydroxide, in the amount of 25 to 75 parts by weight of alkali metal and/or alkaline earth metal oxide or hydroxide;

then add and mix (D) water, in the amount of 0 to 1000 parts by weight of water;

(E) carbonization auxiliaries, in the amount of 0 to 200 parts by weight of carbonization auxiliaries;

(F) metal containing compound that accelerates carbonization, in the amount of 0 to 30 parts by weight of metal containing compound that accelerates carbonization;

(G) heat reflecting compound, in the amount of 0 to 30 parts by weight of heat reflecting compound;

(H) filler, in the amount of 0 to 200 parts by weight of filler;

(I) surfactant, in the amount of 0 to 30 parts by weight of surfactant.

2. The method of claim 1 wherein the carbonization auxiliary is selected from the group consisting of phosphorus containing compounds, boron containing compounds and boron-phosphate containing compounds that produce acidic components in the pyrolysis mixture, in an amount of 0 to 200 parts by weight.

3. The method of claim 1 wherein the metal containing compound that accelerates carbonization is selected from the group consisting of zinc oxide, zinc compounds, zinc borate, alkaline earth metal borates and mixtures thereof, in the amount of 0 to 30 parts by weight of metal containing compounds that accelerates carbonization.

4. The method of claim 1 where in the surfactant is selected from the group consisting of cationic, anionic, non-ionic and amphoteric surfactants, alkylene oxides and alkylene glycols, alcohol and polyols.

5. The method of claim 1 wherein the flammable organic material is selected from the group consisting of polyurethanes, polyester resins, unsaturated polyester resins, polyepoxy resins, polycarbonates, polyamides, polyimides, polyester-polyamide resins, polyacrylonitrile, vinyl polymers and copolymers, olefin polymers and copolymers, vinyl-olefin copolymers, polyphenylene, polysulfone, polyacetal, and other plastics, wood, lignin-cellulose, cellulose and other natural products and mixtures thereof.

6. The product produced by the method of claim 1.

7. A flame retardant product containing termite insecticide produced by applying on and/or incorporating a solid or aqueous urea-boron oxyacid salt condensate on or in a more flammable organic material, under reaction condition or applying sufficient amount to reduce the combustibility of the more flammable organic material, the solid or aqueous urea-boron oxyacid salt condensate is produced by the process consisting of mixing and reacting and optionally heating the following components:

A) urea, in the amount of 100 to 200 parts by weight of urea;

B) boron oxyacid salt, in the amount of 25 to 100 parts by weight of boron oxyacid salt;

C) alkali metal and/or alkaline earth metal oxide or hydroxide in the amount of 25 to 75 parts by weight of alkali and/or alkaline earth metal oxide or hydroxide;

D) water, in the amount of 0 to 1000 parts by weight of water;

E) carbonization auxiliaries, in the amount of 0 to 200 parts by weight of carbonization auxiliaries;

add and mix

F) metal containing compounds that will accelerate the carbonization process, in the amount of 0 to 30 parts by weight of metal containing compound;

G) heat reflecting material, in the amount of 0 to 30 parts by weight of heat reflexing material;

H) filler, in the amount of 0 to 200 parts by weight of filler;

I) surfactant, in the amount of 0 to 30 parts by weight of surfactant.

8. The flame retardant product containing termite insecticide of claim 7 wherein the flame retardant composition is a urea-borate-zinc borate condensate.

9. The flame retardant product containing termite insecticide of claim 7 wherein the aqueous flame retardant and termite insecticide composition is applied on a burning organic material.

10. The flame retardant product containing termite insecticide of claim 7 wherein the carbonization auxiliary is selected from the group consisting of phosphorus containing compounds, boron containing compounds and boron-phosphorus containing compounds that produce acidic components in the pyrolysis mixture, in the amount of 0 to 200 parts by weight of the carbonization auxiliaries.

11. The flame retardant product containing termite insecticide of claim 7 wherein the metal containing compound that accelerates the carbonization is selected from the group consisting of zinc oxide, salicyaldehyde zinc compounds, zinc borate, alkaline earth metal borates and mixtures thereof.

12. The flame retardant product containing termite insecticide of claim 7 wherein the heat reflecting substance is titanium oxide.

13. The flame retardant product containing termite insecticide of claim 7 wherein the filler is selected from the group consisting of urea, melamine, dicyandiamide, melamine cyanurate, amino phosphates, amino polyphosphates, aminoplasts, phenoplasts, powdered synthetic resins, sawdust, carbohydrates, bituminous additives, graphite, graphite compounds, cyanuric derivatives or their formaldehyde resins, lignin, powdered coke, silica, alkali metal silicates, alkaline earth metal silicates, metals, metal silicates, oxides, carbonates, phosphates and borates, glass beads, hollow glass beads, hydrated aluminum oxide, Portland cement and mixtures thereof, in an amount 0 to 300 parts by weight of filler.

14. The flame retardant product containing termite insecticide of claim 7 wherein the more flammable organic material is selected from the group consisting of polyurethanes, polyester resins, unsaturated polyester resins, polyepoxy resins, polycarbonates, polyamides, polyimides, polyester-polyamide resins, polyacrylonitrile, vinyl polymers and copolymers, olefin polymers and copolymers, vinyl-olefin copolymers, polyphenylene, polysulfone, polyacetal, and other plastics, wood, lignin-cellulose, cellulose and other natural products and mixtures thereof.

15. The flame retardant product containing termite insecticide of claim 7 wherein the flammable organic material is a polyurethane foam made flame retardant and containing termite insecticide is produced by the process comprising of mixing and reacting the following components:

a) urea-alkali metal and/or alkaline earth metal-boron oxyacid salt composition produced by the process of claim 1, in the amount 100 to 200 parts by weight of urea-alkali metal and/or alkaline earth metal-boron oxyacid salt composition;

b) an organic compound with one or more active hydrogens, in the amount of 0 to 100 parts by weight of an organic compound;

c) silicone surfactant, in the amount of 0.5 to 5 parts by weight of silicone surfactant;

d) urethane catalyst, in the amount of 0.25 to 10 parts by weight of urethane catalyst;

e) polyisocyanate, in the amount of 25 to 100 parts by weight of polyisocyanate.

* * * * *